Figure 1:
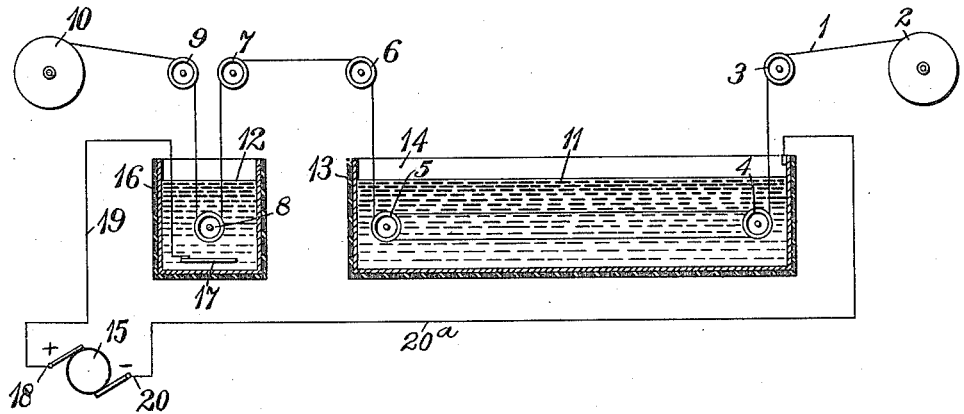

L. W. CHUBB.
PROCESS OF AND APPARATUS FOR COATING ELECTRIC CONDUCTORS.
APPLICATION FILED JUNE 25, 1907.

1,068,410.

Patented July 29, 1913.

2 SHEETS—SHEET 1.

WITNESSES:
Fred H. Miller
R. J. Darbom

INVENTOR
Lewis W. Chubb
BY
Wesley G. Carr
ATTORNEY

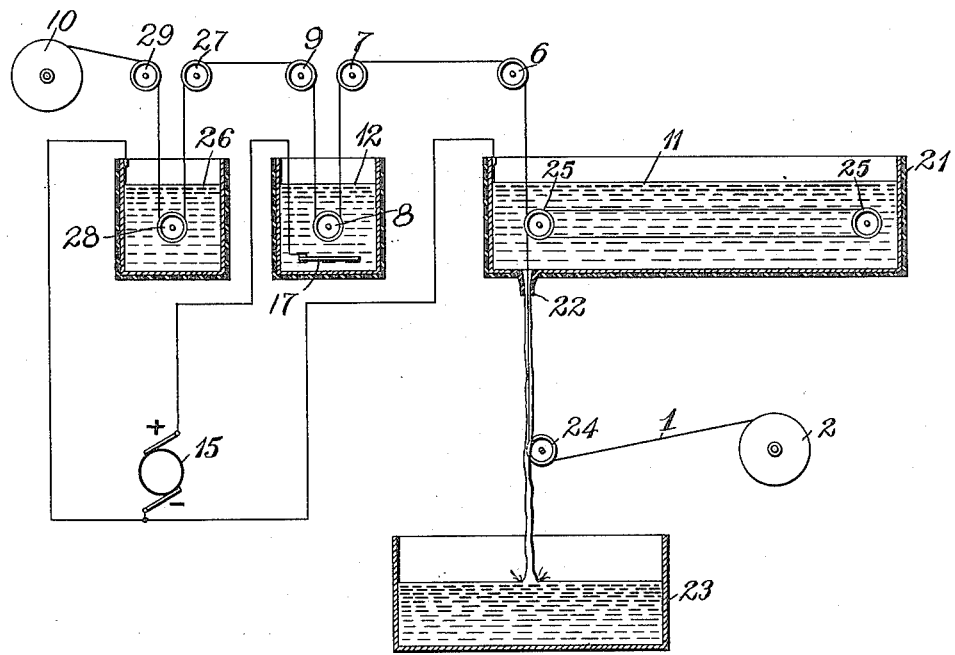

UNITED STATES PATENT OFFICE.

LEWIS W. CHUBB, OF WILKINSBURG, PENNSYLVANIA, ASSIGNOR TO WESTINGHOUSE ELECTRIC & MANUFACTURING COMPANY, A CORPORATION OF PENNSYLVANIA.

PROCESS OF AND APPARATUS FOR COATING ELECTRIC CONDUCTORS.

1,068,410.   Specification of Letters Patent.   Patented July 29, 1913.

Application filed June 25, 1907. Serial No. 380,708.

*To all whom it may concern:*

Be it known that I, LEWIS W. CHUBB, a citizen of the United States, and a resident of Wilkinsburg, in the county of Allegheny and State of Pennsylvania, have invented a new and useful Improvement in Processes of and Apparatus for Coating Electric Conductors, of which the following is a specification.

My invention relates to the coating of wires and other electrical conductors for the purpose of insulating their surfaces and it has for its object to provide a process and an apparatus for continuously and effectively applying very thin fireproof insulating coatings to such conductors as are suitable for use in the construction of coils for electrical apparatus.

The usual windings of small motors and other electrical apparatus, which embody large quantities of small gage wire having cotton or silk insulating coverings, are unduly expensive and also occupy an excessive amount of space by reason of the thickness of the insulating coverings. By employing my process and apparatus, the expense of manufacture and the space occupied by the insulated conductor may be greatly reduced.

It is a well known fact that an electrolytic valve action may be produced in a cell comprising plates of aluminum, copper, cobalt and a few other metals when immersed in a suitable liquid, such as a solution of ammonium borate or a solution of borax and, furthermore, it has been found by repeated tests that the plate which acts as a valve will readily permit the flow of an electric current at a voltage only slightly above a predetermined amount, while it will act as a substantially perfect barrier to currents at a less voltage. This predetermined voltage is dependent upon the material of which the plate is constructed and the solution in which it is immersed. While certain metals, when treated as above indicated, are capable of resisting only relatively low voltages, aluminum, under the same conditions, will become coated with an insulating film which is capable of resisting relatively high voltages.

By utilizing the principle of the electrolytic valve, I have devised a continuous process for producing very thin insulating films on the surfaces of aluminum wires and other conductors which are capable of successfully resisting such electromotive forces as exist between the turns of filed magnet coils of dynamo-electric machines and other windings, and an efficient means for practising the same.

Figure 2:
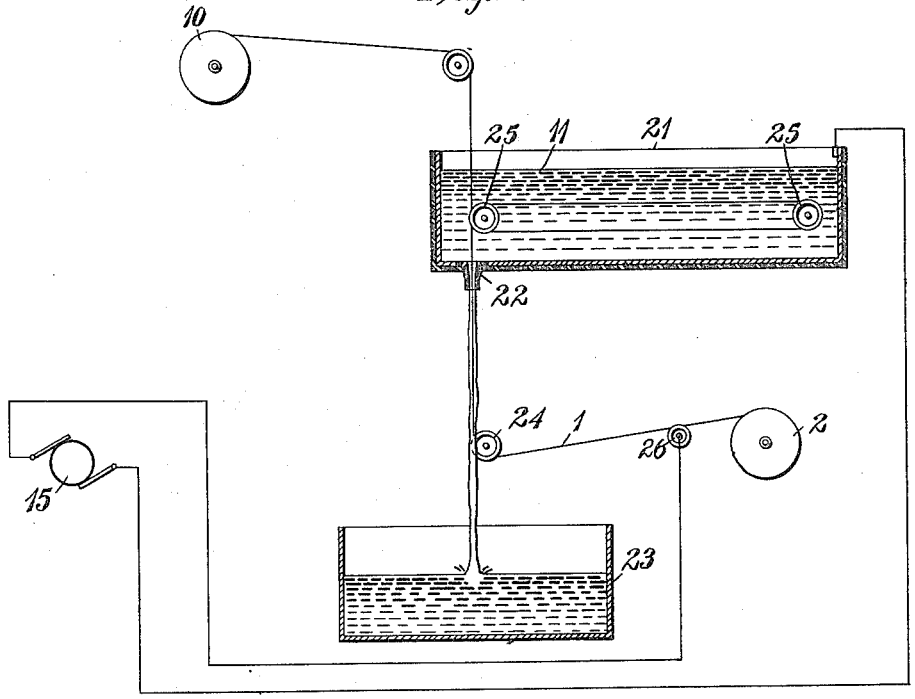

Figure 1, of the accompanying drawings, is a diagrammatic view of an apparatus which I have devised for use in practising my process, and Figs. 2 and 3 are views, similar to Fig. 1, of other arrangements for producing the same result.

Referring first to Fig. 1 of the drawings, the wire or cable 1 to be treated in accordance with my process is supplied from a spool or bobbin 2 to the treating apparatus and after treatment is wound upon a gathering reel 10, sheaves or pulleys 3, 4, 5, 6, 7, 8 and 9 being provided for guiding the wire or cable between the spool and gathering reel. As here shown, the wire or cable passes over the sheave 3 into a liquid bath 11 of ammonium borate or sodium silicate solution, or other suitable liquid which is contained in a tank 13 having a metal lining 14, the sheaves 4 and 5 being located in opposite ends of the tank and submerged in the solution. The wire or cable 1 may be fed directly through the bath under sheaves 4 and 5 or it may be passed back and forth around said sheaves, as indicated in the drawings, in case it is desired to increase the total resistance of the submerged wire or the exposed area of conducting surface. The wire or cable passes from the bath 11 over the sheaves 6 and 7 and under sheave 8 which is located in a bath 12, preferably of the same character as the bath 11 and contained within a tank 16, the wire then passing over the sheave 9 to the gathering reel 10. Located in the bath 12 is a conducting plate 17, to which is attached a conductor 19 leading from the positive terminal 18 of a direct current generator 15, the other terminal 20 of the generator being connected, by means of a conductor 20ª, to the metallic lining 14 of the tank 13. The bath 12 is utilized solely as a contact means for supplying current from the generator 15 to the wire or cable 1, it being a desirable means for this purpose. A thin insulating film is formed on the conductor 1 as it is moved through the bath 11 by reason of the electrolytic action caused by the electric current flowing from the conductor through the bath, but, on account of the electrolytic valve characteristics of the film thus formed, the current will be permitted to flow through it into the conductor without apparent injury thereto, although the film will prevent current flow outwardly through it, even under the pressure of a considerable voltage.

It will be noted that, when the apparatus is operated as above described, the electric current flows through the conductor which is under treatment in a direction which is opposite to the direction of movement of the conductor through the bath, but this is not essential to the process and, if desired, the current may be supplied to the conductor before it enters the treating bath, as, for example, by connecting the positive terminal of the generator to the pulley or sheave 3 or other suitable contact device with which the conductor makes engagement. In the latter case, the bath 12 may be omitted and the negative terminal of the generator be connected to the metal lining 14 of the tank 13, or otherwise placed in electrical connection with the bath 11.

Referring now particularly to the apparatus shown in Fig. 2 of the drawings, the bath 11, in which the treatment of the conductor 1 takes place, is contained in a metal-lined tank 21, in the opposite ends of which are located sheaves 25 under or around which the conductor is guided in its passage from the spool or bobbin 2 to the winding reel 10. In this form of apparatus, the bottom of the tank 21 is provided with an outlet opening 22 through which the solution constituting the bath flows into a supplemental tank 23 located below the same, and a sheave 24 is so located as to guide the conductor through the stream of liquid into the bath. In this case, the positive terminal of the generator 15 is connected to a pulley 26, which is representative of any suitable brush device in engagement with the conductor 1 after it leaves the spool 2, and the other or negative terminal of the generator, is connected to the lining of the tank 21. With this arrangement of apparatus, the stream of liquid which surrounds the conductor for some distance before the latter enters the bath 11 provides a relatively high resistance path for the electric current and, consequently, the insulating film is formed gradually, as the voltage impressed upon the wire increases, instead of being formed very rapidly at the point where the conductor enters the liquid, whereby the possibility of burning or overheating the wire is reduced to a minimum.

Referring now to the apparatus shown in Fig. 3, the conductor 1 passes from the spool or bobbin 2 under the pulley 24, through the stream of liquid which issues from the opening 22 in the tank 21 and falls into the supplemental tank 23, thence one or more times around pulleys 25 in the bath 11, substantially as in the apparatus shown in Fig. 2 and thence over guide pulleys 6 and 7, through a contact bath 12, under pulley 8 therein, over pulley 9 and thence over pulleys 27, under pulley 28 and over pulley 29 to gathering reel 10, the pulley 28 being located in a bath 26, which is preferably of the same character as the baths 11 and 12. The positive terminal of the generator 15 is connected to the plate 17 in the bath 12, and its negative terminal is connected to the lining of the tank 21, substantially as in the apparatus shown in Fig. 1. In this apparatus, however, the negative terminal of the generator 1 is also connected to the metallic lining of the tank containing the bath 26, from which it follows that the coated conductor 1 may receive a further treatment in the bath 26 substantially like the treatment which it receives in the bath 11. While the current is supplied to the coated conductor by means of the bath 12 without apparent injury to the film, in case any injury does occur, by reason of this operation, it will be repaired by the treatment which the conductor receives in the bath 26. Furthermore, it will be apparent from this figure, as well as from Figs. 1 and 2, that the electric current may be supplied to the conductor to be treated either before or after it has received an insulating coating and also in either the direction in which the wire is moving or in the opposite direction and by any suitable contact means, either solid or liquid.

The insulating properties of the coating produced on the surface of a conducting plate immersed in an electrolytic bath depend upon the electric current passing from the conductor to the liquid, the character of the liquid and the length of time the process is continued. Repeated tests have demonstrated, however, that the coating improves quite rapidly until a critical point is reached, after which there is no advantage in continuing the process. It is, therefore, desirable, in a continuous process for treating wires and cables, to keep each portion of the conductor under treatment for such a length of time, depending upon the character of the liquid employed as an electrolyte, as to produce the best possible coating without subjecting the conductor to excessive currents. The current value which may safely be employed for a wire or cable is not determined solely according to the gage, in the usual manner, but is limited by the arcing or burning action which takes place at the point where the conductor enters the liquid. This action may be minimized by increasing the quantity of wire in the bath since, by this means, a conducting surface of large area is in contact with the liquid.

It will be understood from the foregoing description that either a single bath or a plurality of baths may be utilized in my process, and, since the insulating films, which are formed on the surfaces of conductors by the electrolytic action when they are passed through suitable baths, are not injured by the passage of electrical energy through them into the conductors, my process may be practised by the use of alternating current energy in connection with the liquid bath or baths. It will be further understood that modifications of apparatus other than those specifically shown and described may be utilized within the spirit of my invention, and I therefore desire that only such limitations shall be imposed as are indicated in the appended claims.

I claim as my invention:

1. The process of continuously producing an insulating film or coating on a conducting wire or cable which consists in moving the wire or cable progressively through a bath and causing a simultaneous flow of electric current through the wire or cable and the bath.

2. The continuous process of treating a wire or cable to produce an insulating film or coating thereon which consists in moving the wire or cable progressively through a bath and causing a simultaneous flow of electric current into and through the wire or cable and therefrom into and through the bath.

3. The continuous process of treating a conducting wire or cable which consists in moving it progressively through a bath and causing a simultaneous flow of electric current through the wire or cable and the bath, said bath being of such character as to coöperate with the electric current in producing a valvular insulating coating on the wire or cable.

4. The continuous process of forming an insulating valvular coating upon an electric conductor which consists in moving the conductor progressively through a liquid bath and causing a simultaneous flow of electric current into the conductor and therefrom into the bath.

5. The combination with a source of electric current and a liquid bath, of means for moving a conducting wire or cable progressively through the bath and means for causing electric current from said source to traverse the wire or cable and the bath, said bath being of such character as to coöperate with the electric current in producing a valvular insulating coating on the wire or cable.

6. The combination with a liquid bath and means for moving a conductor progressively therethrough, of a source of electric current and terminal connections therefor to insure current flow into the conductor and outwardly therefrom to and through the bath to produce a valvular insulating coating on the conductor.

7. The combination with a source of electric current and liquid baths connected to the respective terminals of said source, of means for continuously guiding a conducting wire or cable through the baths, one of said baths being of such character as to coöperate with the electric current in producing a valvular insulating coating on said wire or cable.

8. The combination with a source of electric current and a plurality of liquid baths, to which the terminals of said source are connected, of means for moving a conductor successively through the baths in such manner as to establish an electric circuit from one of the baths through the conductor and from it, as an anode, through the liquid of the other bath to produce a valvular insulating coating thereon.

9. The combination with a source of electric current and two liquid baths which are respectively connected to the terminals of the source of current, of means for continuously moving a conductor through the baths in such manner as to compel the electric current to flow through it and through one of the baths to produce an insulating coating thereon.

10. The combination with a direct current generator, two baths of ammonium borate solution connected to the generator terminals, and guide pulleys immersed in the baths, of a gathering reel, and means for moving a conducting wire continuously over the guide pulleys to the gathering reel from bath to bath, a current-conducting circuit being established from one bath to the other through said conducting wire.

11. The combination with a liquid bath having a continuous discharge, of means for moving a conducting wire into the bath, through the discharge, and means for supplying an electric current to said wire in order to produce, through the liquid, a valvular insulating coating thereon.

12. The combination with a source of electric current, a tank, a liquid bath connected to one terminal of said source and having a discharge opening from which the liquid flows continuously, of a second bath connected to the other terminal of said source, and means for continuously moving a conducting wire through the discharge opening and through the bath to produce a valvular insulating coating thereon.

13. The combination with a direct current generator, a pair of fluid-containing tanks having metal linings severally connected to the terminals of the generator, and a gathering reel, of means for moving a conducting wire through the baths to the gathering reel, one of the tanks being provided with a submerged orifice through which the wire is introduced and from which liquid is continuously flowing.

14. The combination with a liquid bath and means for submerging successive lengths of a conducting wire in said bath, of means for introducing an electric current into said wire at a given point and means for withdrawing such current at another point through the bath.

15. The combination with a liquid bath and means for submerging successive lengths of a conducting wire in said bath, of means for introducing an electric current into said wire outside the bath and means for withdrawing the current from the wire through the bath.

16. The combination with a liquid bath and means for moving a conductor progressively therethrough, of a source of electric current and terminal connections therefor to insure current flow into the conductor outside the bath and outwardly therefrom to and through the bath to produce a valvular insulating coating on the conductor.

17. The combination with a tank having a conducting lining and containing a body of liquid, of means for moving an electric conductor progressively through said body of liquid and a source of electric current having its positive and negative terminals respectively connected to said conductor and to the lining of said tank.

18. The method of coating an electric conductor which consists in subjecting successive lengths thereof simultaneously to a liquid bath and to an electric current that flows from the conductor into and through the bath.

In testimony whereof, I have hereunto subscribed my name this 20th day of June, 1907.

LEWIS W. CHUBB.

Witnesses:
R. D. DE WOLF,
BIRNEY HINES.